United States Patent
Cerami et al.

(10) Patent No.: US 7,464,164 B2
(45) Date of Patent: Dec. 9, 2008

(54) LINKING ORDER ENTRY PROCESS TO REALTIME NETWORK INVENTORIES AND CAPACITIES

(75) Inventors: Richard S. Cerami, Denver, CO (US); Timothy Figueroa, Aurora, CO (US); Roxanna Storaasli, Denver, CO (US)

(73) Assignee: Qwest Communications International, Inc., Denver, CO (US)

( * ) Notice: Subject to any disclaimer, the term of this patent is extended or adjusted under 35 U.S.C. 154(b) by 1355 days.

(21) Appl. No.: 09/921,274

(22) Filed: Aug. 1, 2001
(Under 37 CFR 1.47)

(65) Prior Publication Data

US 2002/0111883 A1 Aug. 15, 2002

Related U.S. Application Data

(60) Provisional application No. 60/222,791, filed on Aug. 1, 2000.

(51) Int. Cl.
- *G06F 15/173* (2006.01)
- *G06F 9/44* (2006.01)
- *G06F 9/46* (2006.01)
- *H04J 3/16* (2006.01)

(52) U.S. Cl. .................. 709/226; 709/223; 709/224; 709/225; 709/222; 370/468

(58) Field of Classification Search ......... 209/222–226; 705/7–8, 22; 370/230, 468
See application file for complete search history.

(56) References Cited

U.S. PATENT DOCUMENTS

| | | | |
|---|---|---|---|
| 5,097,469 A | | 3/1992 | Douglas |
| 5,261,044 A | | 11/1993 | Dev et al. |
| 5,295,244 A | | 3/1994 | Dev et al. |
| 5,504,863 A | | 4/1996 | Yoshida |
| 5,504,921 A | | 4/1996 | Dev et al. |
| 5,650,994 A | * | 7/1997 | Daley .................. 370/259 |
| 5,655,081 A | | 8/1997 | Bonnell et al. |
| 5,666,481 A | | 9/1997 | Lewis |
| 5,680,325 A | * | 10/1997 | Rohner .................. 709/220 |
| 5,692,030 A | | 11/1997 | Teglovic et al. |
| 5,737,319 A | * | 4/1998 | Croslin et al. ............ 709/220 |
| 5,751,933 A | | 5/1998 | Dev et al. |
| 5,768,614 A | | 6/1998 | Takagi et al. |
| 5,799,154 A | | 8/1998 | Kuriyan |
| 5,812,529 A | * | 9/1998 | Czarnik et al. ............ 370/245 |

(Continued)

FOREIGN PATENT DOCUMENTS

EP 1009154 A2 6/2000

*Primary Examiner*—Ario Etienne
*Assistant Examiner*—Gregory G. Todd
(74) *Attorney, Agent, or Firm*—Townsend and Townsend and Crew LLP

(57) ABSTRACT

A method for determining spare capacity for a video and data network from a network element database is provided. The method includes receiving a request for spare capacity in the video and data network. The request may include a service area identifier, which may be a telephone number of a customer. Using the service area identifier, equipment is then identified and checked for spare capacity. The network element database is checked to determine if the identified equipment has spare data and video capacity and if the equipment has spare data and video capacity, spare video and data capacity is calculated for the identified equipment.

36 Claims, 11 Drawing Sheets

U.S. PATENT DOCUMENTS

| | | | |
|---|---|---|---|
| 5,850,388 A | 12/1998 | Anderson et al. | |
| 5,870,558 A * | 2/1999 | Branton et al. | 709/224 |
| 5,872,911 A | 2/1999 | Berg | |
| 5,881,048 A | 3/1999 | Croslin | |
| 5,892,812 A | 4/1999 | Pester, III | |
| 5,892,937 A | 4/1999 | Caccavale | |
| 5,920,846 A | 7/1999 | Storch et al. | |
| 5,946,373 A | 8/1999 | Harris | |
| 5,953,389 A | 9/1999 | Pruett et al. | |
| 5,958,009 A | 9/1999 | Friedrich et al. | |
| 5,974,237 A | 10/1999 | Shurmer et al. | |
| 5,978,358 A * | 11/1999 | Wang et al. | 370/234 |
| 5,987,514 A | 11/1999 | Rangarajan | |
| 5,991,264 A | 11/1999 | Croslin | |
| 5,995,485 A | 11/1999 | Croslin | |
| 5,999,179 A | 12/1999 | Kekic et al. | |
| 5,999,540 A | 12/1999 | McGhee | |
| 6,002,996 A | 12/1999 | Burks et al. | |
| 6,006,016 A | 12/1999 | Faigon et al. | |
| 6,018,300 A | 1/2000 | Dowden et al. | |
| 6,023,456 A * | 2/2000 | Chapman et al. | 370/252 |
| 6,038,212 A | 3/2000 | Galand et al. | |
| 6,058,103 A | 5/2000 | Henderson et al. | |
| 6,081,517 A * | 6/2000 | Liu et al. | 370/352 |
| 6,085,243 A | 7/2000 | Fletcher et al. | |
| 6,147,975 A | 11/2000 | Bowman-Amuah | |
| 6,148,335 A | 11/2000 | Haggard et al. | |
| 6,160,810 A | 12/2000 | Brodigan | |
| 6,169,724 B1 | 1/2001 | Begum et al. | |
| 6,195,697 B1 | 2/2001 | Bowman-Amuah | |
| 6,199,180 B1 | 3/2001 | Ote et al. | |
| 6,205,563 B1 | 3/2001 | Lewis | |
| 6,208,637 B1 | 3/2001 | Eames | |
| 6,209,033 B1 * | 3/2001 | Datta et al. | 709/224 |
| 6,233,449 B1 | 5/2001 | Glitho et al. | |
| 6,249,883 B1 | 6/2001 | Cassidy et al. | |
| 6,269,330 B1 | 7/2001 | Cidon et al. | |
| 6,285,748 B1 | 9/2001 | Lewis | |
| 6,327,669 B1 | 12/2001 | Croslin | |
| 6,349,333 B1 | 2/2002 | Panikatt et al. | |
| 6,374,288 B1 | 4/2002 | Bhagavath et al. | |
| 6,388,990 B1 * | 5/2002 | Wetzel | 370/230 |
| 6,426,948 B1 | 7/2002 | Bowman-Amuah | |
| 6,430,150 B1 | 8/2002 | Azuma et al. | |
| 6,446,123 B1 | 9/2002 | Ballantine et al. | |
| 6,463,079 B2 | 10/2002 | Sundaresan et al. | |
| 6,480,901 B1 | 11/2002 | Weber et al. | |
| 6,484,200 B1 | 11/2002 | Angal et al. | |
| 6,499,017 B1 | 12/2002 | Feibelman et al. | |
| 6,542,266 B1 | 4/2003 | Phillips et al. | |
| 6,556,659 B1 | 4/2003 | Bowman-Amuah | |
| 6,571,285 B1 | 5/2003 | Groath et al. | |
| 6,578,077 B1 * | 6/2003 | Rakoshitz et al. | 709/224 |
| 6,580,727 B1 | 6/2003 | Yin et al. | |
| 6,597,660 B1 * | 7/2003 | Rueda et al. | 370/230.1 |
| 6,597,689 B1 | 7/2003 | Chiu et al. | |
| 6,604,137 B2 * | 8/2003 | Cowan et al. | 709/224 |
| 6,611,867 B1 * | 8/2003 | Bowman-Amuah | 709/224 |
| 6,631,407 B1 | 10/2003 | Mukaiyama et al. | |
| 6,647,414 B1 | 11/2003 | Eriksson et al. | |
| 6,711,137 B1 * | 3/2004 | Klassen et al. | 370/252 |
| 6,727,927 B1 | 4/2004 | Dempski et al. | |
| 6,760,847 B1 | 7/2004 | Liu et al. | |
| 6,765,864 B1 | 7/2004 | Natarajan et al. | |
| 6,765,873 B1 * | 7/2004 | Fichou et al. | 370/235 |
| 6,775,303 B1 | 8/2004 | Rustad et al. | |
| 6,785,296 B1 | 8/2004 | Bell | |
| 6,788,765 B1 | 9/2004 | Beamon | |
| 6,804,714 B1 * | 10/2004 | Tummalapalli | 709/224 |
| 6,891,825 B1 | 5/2005 | O'Dell et al. | |
| 6,900,807 B1 | 5/2005 | Liongosari et al. | |
| 6,901,530 B2 | 5/2005 | Cerami et al. | |
| 2002/0073062 A1 | 6/2002 | Cerami et al. | |
| 2002/0073355 A1 | 6/2002 | Cerami et al. | |
| 2002/0078017 A1 | 6/2002 | Cerami et al. | |
| 2003/0149919 A1 | 8/2003 | Greenwald et al. | |
| 2005/0183129 A1 | 8/2005 | Cerami et al. | |

* cited by examiner

LINKING ORDER ENTRY PROCESS TO REALTIME NETWORK INVENTORIES AND CAPACITIES

CLAIM OF PRIORITY

This application claims priority from U.S. Provisional Patent Application Ser. No. 60/222,791, filed Aug. 1, 2000, entitled "Management of Virtual and Physical Network Inventories," which is hereby incorporated by reference, as is set forth in full in this document, for all purposes.

CROSS-REFERENCES TO RELATED APPLICATIONS

This application is related to the co-pending applications No. 09/921,282 entitled "MANAGEMENT OF VIRTUAL AND PHYSICAL NETWORK INVENTORIES"; No. 92/921,285 entitled "PROVISIONING SYSTEM AND METHOD FOR AUTO-DISCOVERING CUSTOMER PREMISES EQUIPMENT IN ACTIVATING xDSL"; No. 09/921,294 entitled "PERFORMANCE MODELING IN A VDSL NETWORK"; No. 09/921,276 entitled "FAULT MANAGEMENT IN A VDSL NETWORK" ; No. 09/921,277 entitled "FAULT MANAGEMENT IN A VDSL NETWORK"; No. 09/921,283 entitled "PROACTIVE REPAIR PROCESS IN THE xDSL NETWORK (WITH A VDSL FOCUS)"; No. 09/921,275 entitled "PROACTIVE SERVICE REQUEST MANAGEMENT ANT) MEASUREMENT", all filed Aug. 1, 2001, the disclosures of which are incorporated herein by reference.

BACKGROUND OF THE INVENTION

The present invention relates to the linking management of virtual and physical network inventories to order entry and capacity checking and more specifically to linking management of virtual and physical network inventories to order entry and capacity checking for a xDSL network.

As networks providing digital services to consumers are built out to accommodate more consumers, the networks become more complicated and harder to manage. Additionally, as companies increase capital expenditures to build out these networks, more emphasis is focused on increasing the sales of services that are provided through a network. In a typical operation, a network may provide data services to and from an Internet Service Provider (ISP) and a consumer. Thus, a user typically accesses the Internet through the network connection. Additionally, video services may be offered through the network to provide a consumer with additional choices such as cable T.V. from a satellite or cable provider. With the increase in services, continual build-out of the network, and the exponentially increasing number of consumers added to these services, it becomes increasingly difficult to manage the assets of the network.

Companies include departments such as sales, engineering, and marketing that need different views of the same network inventory. However, even if the departments interact with the inventory of the network, the inventory is not a complete and up-to-date version. For example, a sales department takes orders from customers on the assumption that the network is physically able to offer service to the customers. However, the sales department takes the order without considering network capacity and/or network quality.

Additionally, the marketing department is used to forecast an amount of capacity to add to the network. The marketing department, however, does not include in-progress network additions or pending sales in their marketing forecast and thus, the inventory data used for forecasting capacity is incomplete. Therefore, forecasts to add capacity to the network may be flawed and inaccurate.

The engineering department designs and builds out the network after receiving the marketing forecast. In building out the network, the engineering department plans and installs physical network elements, and assigns virtual paths through the network elements to enable service to customers. For example, installing physical network elements includes installing network elements and associated cards/ports in the network elements that enable new customers to receive service. After being installed, identifiers for the new ports/cards are manually entered into an inventory data base and manually synched between the existing network elements in the inventory data base. Additionally, Interoffice Facilities and Fibers (IOF) identifiers are manually inventoried. Thus, identifiers for devices such as DSLAMs, routers, fiber components, and other components of the network are manually entered. Also, management of the assignments of logical paths in the network is manual and are repeatedly inputted for each network element in the logical path.

Thus, the management of inventory and the access of inventory are manual processes. Additionally, although engineering may manually inventory physical and logical network designs, the inventory is not accessed by other departments when making decisions. For example, the sales department approves orders for service without referencing any capacity or planned information. Basically, the sales department approves any order without verifying if the network has capacity to provide the service. Also, the sales department does not distinguish between different services that may be offered through the network. Thus, network capacity may be filled with less profitable services. Additionally, the marketing department produces capacity forecasts without the knowledge of in-progress network additions.

Thus, the departments are making decisions that are dependent on actions from each group without information of the other group's actions. This leads to inefficient management of network inventory.

BRIEF SUMMARY OF THE INVENTION

A method for determining spare capacity for a video and data network from a network element database is provided in one embodiment of the invention. In one embodiment, the method includes receiving a request for spare capacity in the video and data network. In one embodiment, the request includes a service area identifier, which may be a telephone number of a customer. Using the service area identifier, equipment is then identified and checked for spare capacity. The network element database is checked to determine if the identified equipment has spare data and video capacity and if the equipment has spare data and video capacity, spare video and data capacity is calculated for the identified equipment.

In one embodiment, the video and data network comprises a type of Digital Subscriber Line (xDSL) network, such as a Very high bit rate DSL (VDSL) network.

A further understanding of the nature and advantages of the invention herein may be realized by reference of the remaining portions in the specification and the attached drawings.

DETAILED DESCRIPTION OF THE INVENTION

Figure 1:
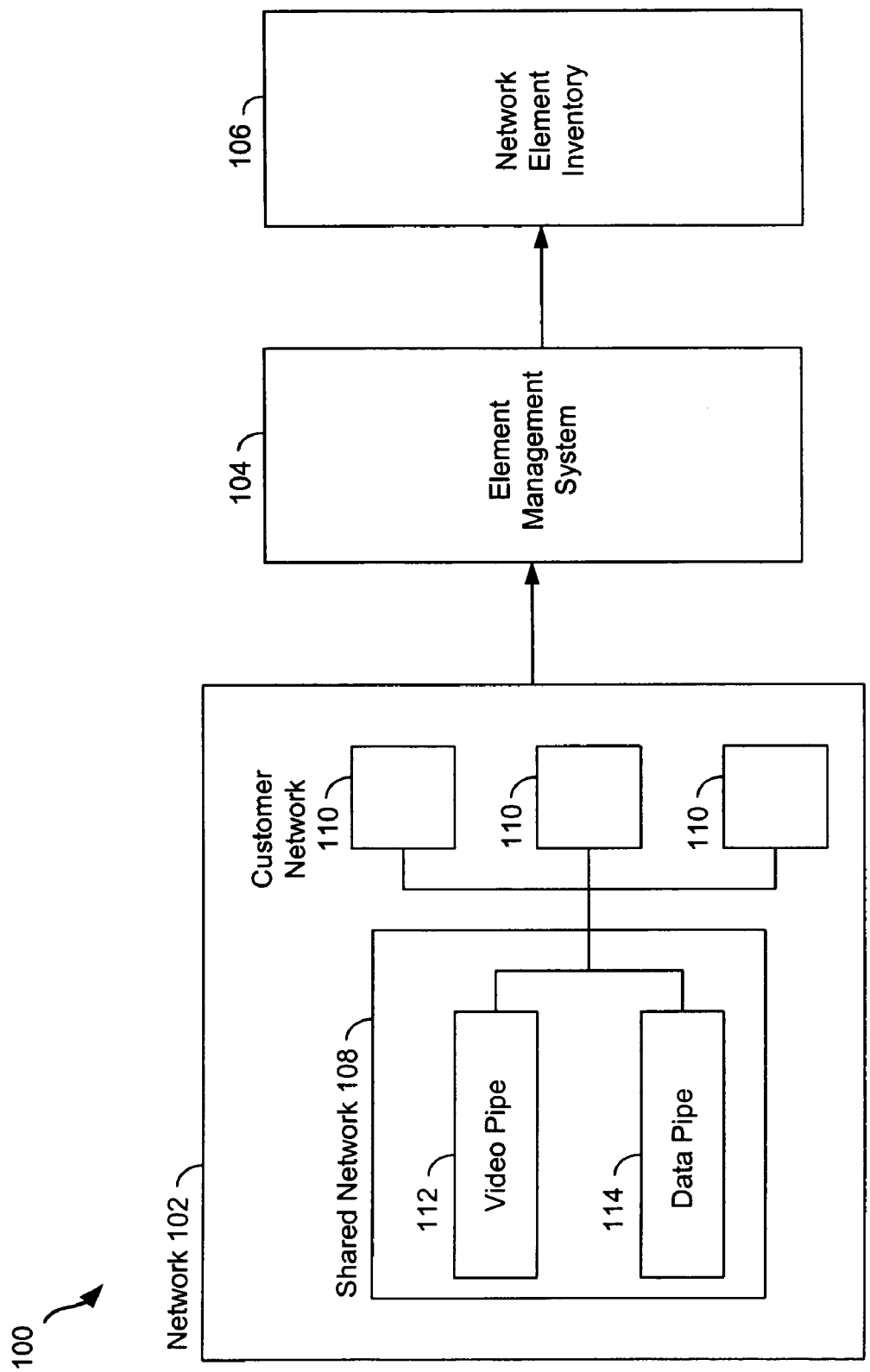
FIG. 1 illustrates a system including components that may be included in a network element inventory.

FIG. 1 illustrates a system 100 including a network 102 and a network element inventory 106. As shown, network 102, an element management system 104, and network element inventory 106 are included.

Network 102 may be any network capable of delivering telephony, or high speed data to customers. In one embodiment, network 102 is a xDSL network capable of delivering telephony, video, and/or data to customers at high speeds. It is noted for purposes of understanding the present invention, the term xDSL is used as a broad label for identifying a number of different types of digital subscriber line (DSL) signal formats, such as rate adaptive DSL (RADSL), Asymmetric DSL (ADSL), high-bit-rate DSL (HDSL), and very-high-data-rate DSL (VDSL). Compatibility for two or more of these formats within the same distribution system may also be provided.

As shown, network 102 includes a shared network 108 and a plurality of customer networks 110. Customer networks 110 may be any network connecting the customer to shared network 108. A customer network in the plurality of customer networks 110 may be an individual network for one customer or a network for a group of customers. Network 102 includes a plurality of network elements that deliver video and data through network 102.

Shared network 108 may be any network that is shared among plurality of customer networks 110. Shared network 108 handles the flow of telephony, video, and/or data from a service provider and routes signals to plurality of customer networks 110, which in turn, routes the signals to individual customers. Additionally, shared network 108 includes a video pipe 112 and data pipe 114. Video pipe 108 delivers video to plurality of customer networks 110 and data pipe 114 delivers data to plurality of customer networks 110. Shared network 108 also may be configured to provide telephony service to customers, for example through data pipe 114, or telephony service may be provided through a public switch at a central office, as discussed below.

Element Management System (EMS) 104 may be any application capable of receiving/discovering data from shared network 108 and plurality of customer networks 110. In one embodiment, EMS 104 is the only system that may configure and/or access data from shared network 108 and plurality of customer networks 110. The data received from the network may include, for example, performance data, fault data, and an inventory of network elements. Additionally, EMS 104 may include customer data, which includes data relating customers to designated physical and logical paths in shared network 108 and plurality of customer networks 110. In one embodiment, multiple EMS 104s may be included and discover data from various elements to network 102.

Network element inventory 106 may be any database capable of storing data relating to network 102. In one embodiment, the network element inventory 106 may receive data from shared network 108 and plurality of customer networks 110 directly thereby removing the need for EMS 104. Network element inventory 106 includes network discovered physical inventory, network discovered logical inventory, and planned network inventory in one embodiment.

Figure 2:
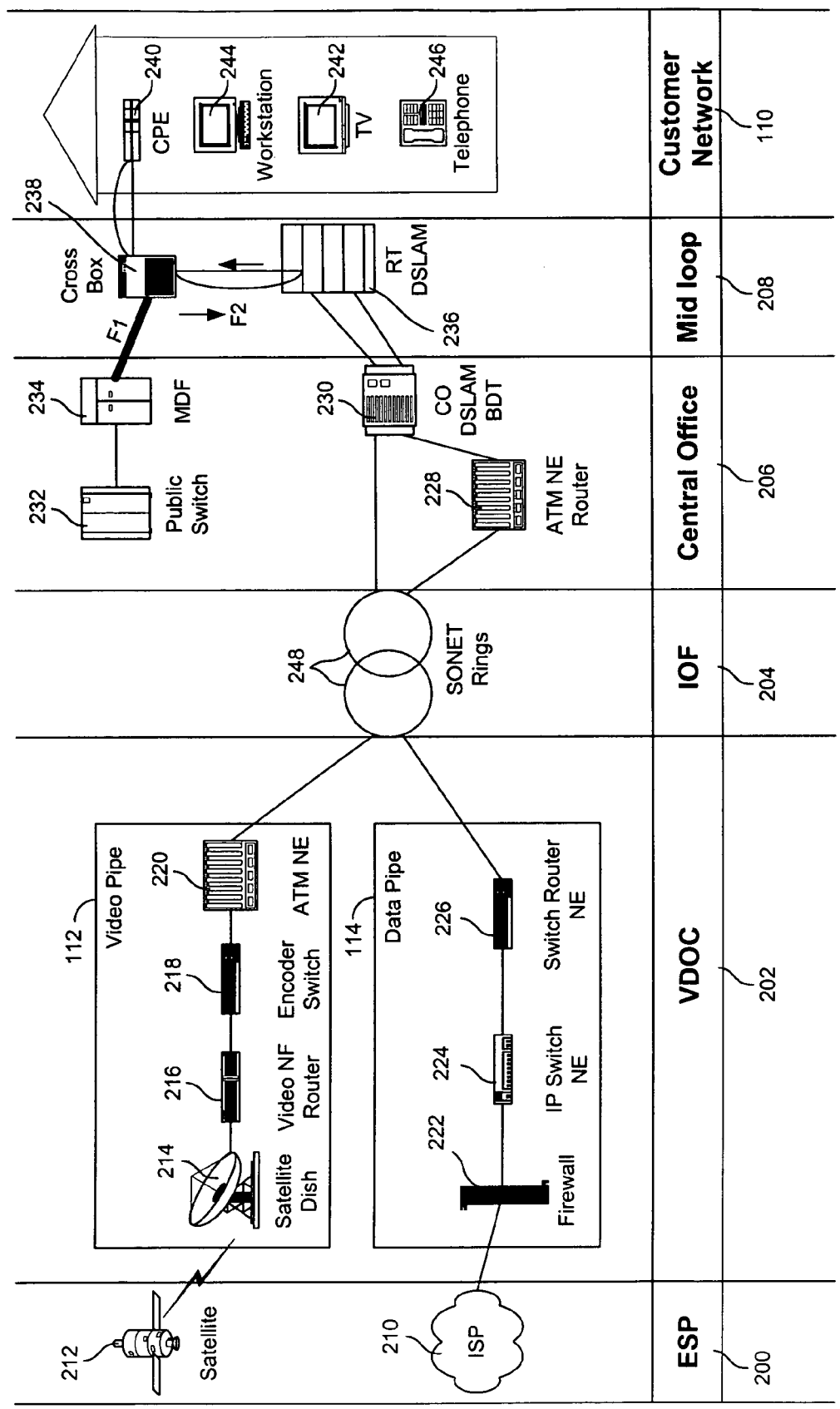
FIG. 2 illustrates the network of FIG. 1 in more detail.

In FIG. 2, network 102 is shown in more detail according to one embodiment. As shown, shared network 108 includes an external service provider section (ESP) 200, a video/data operation center (VDOC) 202, an interoffice facility (IOF) 204, central office (CO) 206, and midloop 208. In one embodiment, ESP 200 includes ISP 210 and satellite 212. ISP 210 provides access to the Internet and other data services. Satellite 212 provides access to video and other video services. While the data and video providers are shown as ISP and satellite providers, it will be understood by a person skilled in the art that other ways of providing video and data services are possible.

VDOC 202 includes video pipe 112 and data pipe 114 of FIG. 1. In one embodiment, video pipe 112 can be configured to deliver video signals to and from ESP 200 and/or IOF 204 through optic fiber, such as OC-12c, and data pipe 114 can be configured to deliver data to and from the ESP 200 and/or IOF 204 through optic fiber, such as OC-3c. However, in accordance with other embodiments of the invention, video pipe 112 and data pipe 114 can utilize any other suitable broadband connection deliver the video and data signals, such as other forms of fiber optics, wireless technologies, or the like. Thus, the present invention is not limited to the illustrated embodiment.

In one embodiment, video pipe 112 delivers video using a video asynchronous transfer mode (ATM) based protocol. In one embodiment, data pipe 114 delivers data using an Internet Protocol (IP) based protocol.

Video pipe 112 includes a satellite dish 214, video router 216, encoder switch 218, and ATM network element (NE) 220. Data pipe 114 includes a firewall 222, IP switch network element 224, and switch router network element 226. It should be understood that a person of skill in the art will appreciate other ways of implementing video and data pipes, such as video head-ends currently known in the art.

IOF 204 includes synchronous optical network rings (SONET) 248. SONET 248 may be any optical network capable of delivering video and data to and from the VDOC 202 and central office 206.

Central Office (CO) 206 includes an ATM router NE 228 and CO Digital Subscriber Loop Access Module (DSLAM) 230. In one embodiment, CO DSLAM 230 may be a broadband digital terminal (BDT). ATM router NE 224 and CO DSLAM BDT 230 are coupled to IOF 230 and midloop 208 through optic fiber, such as OC-3cand OC-12c. Additionally, CO 206 includes a public switch 230 and Main Distribution Frame (MDF) 234. Public switch 230 and MDF 234 is where an outside customer network is coupled to the shared network. In one embodiment, public switch 232 and MDF 234 provide telephony service to a customer. Additionally, MDF 234 is coupled to midloop section 208.

Midloop 208 includes a RT DSLAM 236 and may include a crossbox 238. Crossbox 238 provides a connection from shared network 108 to plurality of customer networks 110. RT DSLAM 236 may include Universal Service Access Multiplexers (USAM), Multiple Dwelling Units (MDUs) and/or Broadband Network Units (BNUs). Additionally, CO DSLAM 230 is associated to RT DSLAM 236. RT DSLAM 236 may include an Optical Network Unit (ONU), which acts as a router for RT DSLAM 236.

RT DSLAM 236 is a network element that is used to convert optical video and data signals sent from CO DSLAM 230 into electrical signals for deployment to the customer locations over electrical cable connections, such as twisted pair copper cable. The electrical signals may be combined with a telephone signal and are sent to customer's locations. By positioning RT DSLAMs 236 closer to customer locations, the reach of the high speed data service is extended. In one embodiment, RT DSLAM 236 is a node positioned in a neighborhood (fiber-to-the-node deployment) and is configured to convert the optical video and data signals to electrical signals for deployment to a plurality of customer locations via cross box 238 used to serve that neighborhood.

In another embodiment, RT DSLAM 236 is a terminal node for fiber-to-the-curb deployment and feeds service to a customer location directly without the need for cross box 238.

In yet another embodiment, a RT DSLAM 236 is the network element that is suitable for location in a multiple dwelling unit (MDU), such as an office or apartment building. In this particular embodiment, RT DSLAM 236 is a variation of a terminal for fiber-to-the-node deployment and feeds service to the customers in the MDU directly and not through cross box 238 associated with a distribution area (DA).

If midloop 208 includes cross box 238, cross box 238 relays signals from RT DSLAM 236 from midloop 208 to the customer.

As shown, a customer network in plurality of customer networks 110, includes a home network and/or Customer Premise Equipment (CPE) 240. CPE 240 is coupled to the cross box 238 or RT DSLAM 236 if cross box 238 is not present and receives the video, data, and/or telephony signals. CPE 240 may be coupled to a TV 242, workstation 244, and/or telephone 246. Thus, the customer can receive telephony, video, and/or data signals from the network. In one embodiment, CPE 240 may be replaced by other equipment capable of receiving signals from shared network 108.

It will be understood that a person of skill in the art will appreciate other ways of implementing network 102. Thus, network 102 is not limited to the above description.

Network Element Inventory

Figure 3:
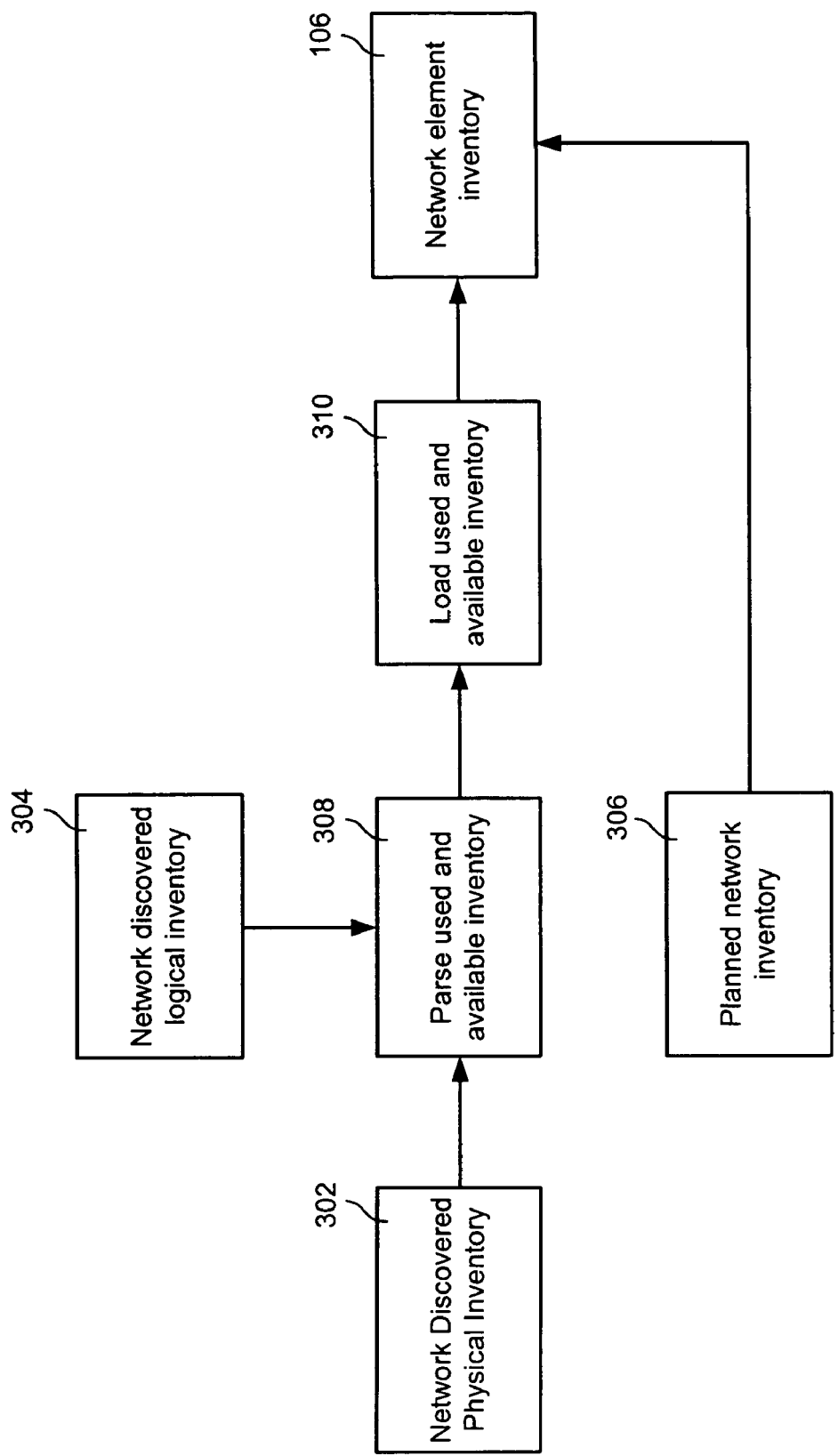
FIG. 3 illustrates elements of network element inventory.

FIG. 3 illustrates elements of network element inventory 106 according to one embodiment. As shown, network element inventory 106 includes network discovered physical inventory 302, network discovered logical inventory 304, and planned network inventory 306. Planned network inventory 306 may also include planned logical and planned physical inventory.

Network discovered physical inventory 302 and network discovered logical inventory 304 may also be parsed and normalized (Step 308) and loaded (Step 310) into network element inventory 106. However, the parsing and loading step may be unnecessary and network discovered logical inventory 304 and physical inventory 302 may be directly loaded into network element inventory 106. Parsing and loading network discovered physical inventory 302 and logical inventory 304 is done to normalize data received from different network elements because different network elements may send and manage data in different formats.

Network discovered physical inventory 302 includes physical inventory of the network that is self discovered by intelligent network elements of the network. Network discovered physical inventory 302 represents installed physical inventory of the physical network. In one embodiment, network discovered physical inventory 302 is created daily in element management system 104. As discussed above, EMS 104 is a central repository where self-discovered inventory information from network 102 is discovered and retrieved. The total installed inventory includes used (e.g., allocated to a customer), available (e.g., available for customer use) or possible (e.g., not available for customer use) network components.

Additionally, network discovered logical inventory 304 includes logical or virtual inventory of the network that is self discovered by intelligent network elements. In one embodiment, the logical inventory includes installed virtual paths and assignments. In one embodiment, network discovered inventory logical inventory 304 may be created in EMS 104. The logical inventory also represents the used and available logical inventory in network 102.

Planned network inventory 306 includes installed (with only a partial in use status) inventory, planned inventory, and pre-assigned planned inventory information. Planned network inventory 306 may be automated by including tools for operation systems, such as engineering, sales, and marketing, to enter planned network inventory into network element inventory 106. For example, once the engineering department develops spreadsheets or other documentation representing planned inventory, pre-assignments are entered into network element inventory 106 through a graphical user interface (GUI).

Additionally, in one embodiment, planned logical inventory is entered automatically into network element inventory 106 through a logical path automation process that facilitates management of Virtual Channel Indicator/Virtual Path Indicator (VCI/VPI) pools within the network. The pools of VPI/VCI links are created to support the flow of video and data to users over the network. The VPI/VCI links include the virtual or logical path that data is routed through over the physical network. In order to implement an automated VPI/VCI managed pool, a centralized system allowing entry of a virtual path into one manager or system or VPI/VCI administration system, which will propagate the same virtual path into multiple network elements is provided. Thus, the labor intensive task that involved entering the same information for the same virtual path into multiple network elements or systems (ATM switches, routers, CO DSLAM 230 and RT DSLAM 236) is avoided.

When construction of new equipment is completed or a user's report indicating that existing capacity is nearly consumed, an assignment process to decide VPI/VCI allocation is initiated. Once the allocation is completed, actual assignment needs to be configured in, for example, routers, ATM switches, CO DSLAM 230 and RT DSLAM 236.

In the VPI/VCI system, an administrator enters the assignments into a VPI/VCI administration system. The system then takes those assignments and propagates the appropriate assignments to the network elements. Additionally, the system records the assignments and documents the assignments into network element inventory 106. Thus, multiple manual entries required for the routers, ATM switches, CO DSLAM 230, and RT DSLAM 236 are avoided. Further, the additional task of recording those assignments is avoided. Additionally, administrative errors are reduced because duplicate multiple entries of assignments do not need to be made and recorded. Also, when network elements are changed for capacity or for maintenance reasons, the entry of VPI/VCI information will have to be repeated for the new switch. However, the VCI/VPI administrative system will be able to repeat the location and assignment without any extra manual steps. Thus, network rearrangement work will not affect the allocation of VCI/VPI assignments.

In one embodiment, the planned network inventory 306 may include CO DSLAM 230 (e.g., broadband digital terminal (BDT) information) and/or RT DSLAM 236 information. CO DSLAM 230 information may include, for example, an IP address, central office ID [CLLI code], relay rack, planned in-service date, number of cards, number ports per card, and planned job number associated with CO DSLAM 230 installation.

In one embodiment, RT DSLAM 236 information may include, for example, circuit ID of facility back to the central office, distribution area (DA) served by the RT DSLAM 236, wire center ID [CLLI code], cabinet ID [CLLI code], cabinet location (address), associated crossbox address, planned in service date, planned job number associated with RT DSLAM 236 installation and the number and type of cards within the RT DSLAM 236.

Additionally, planned network inventory 306 may include planned assignment (reservation) information. In one embodiment, the pre-assignment data includes CO DLSLAM 230 to RT DSLAM 236 assignment information. The assignment information includes how network 102 is connected from the CO 206 to crossbox 208. In a specific embodiment, the configuration and management of the facility connecting CO DSLAM 230 with the RT DSLAM 236.

Network element inventory 106 may include a graphical user interface (GUI) to add, change, or delete planned inventory information. Additionally, in one embodiment, the addition or deletion of planned assignments (reservations) of cards to specific operation systems. Further, the system may provide a display of existing, consumed, spare, and planned additional capacity associated with a given central office 230 and/or RT DSLAM 236 location.

By integrating self-discovered, used and available inventory with the planned inventory, a single, consistent, and consolidated view is realized. This view may then be customized for access by other operation systems and organizations.

Figure 4A:
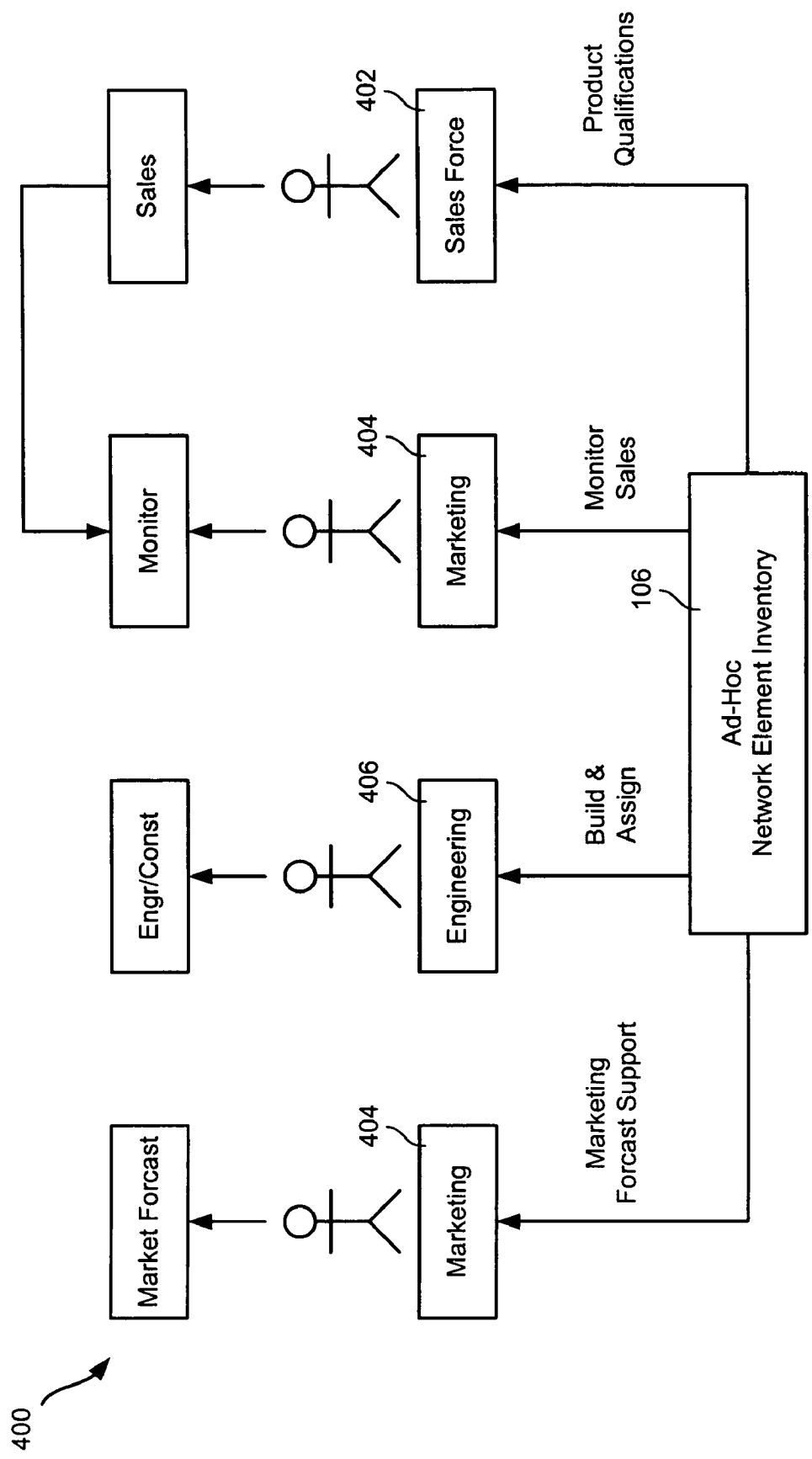
FIGS. 4a-d illustrate a process for managing network element inventory.

FIGS. 4a-d illustrate a process for managing network element inventory 106 and for product deployment for a xDSL sales service. In FIG. 4a, a number of different operation systems are dependent on having access to network element inventory 106, such as the marketing 404, engineering 406, and sales 402 departments. Although sales 402, marketing 404, and engineering 406 departments are used to discuss the multiple operations systems, it will be understood that other operation systems may be included and access network element inventory 106.

The process includes marketing 404 providing a market forecast of expected demand and available capacity that needs to be built to meet demand to engineering 406. Engineering 406 then plans and builds the network and assigns capacity to the network. Marketing 404 monitors the construction and provides sales 402 with forecast of capacity that may be sold.

Figure 4B:
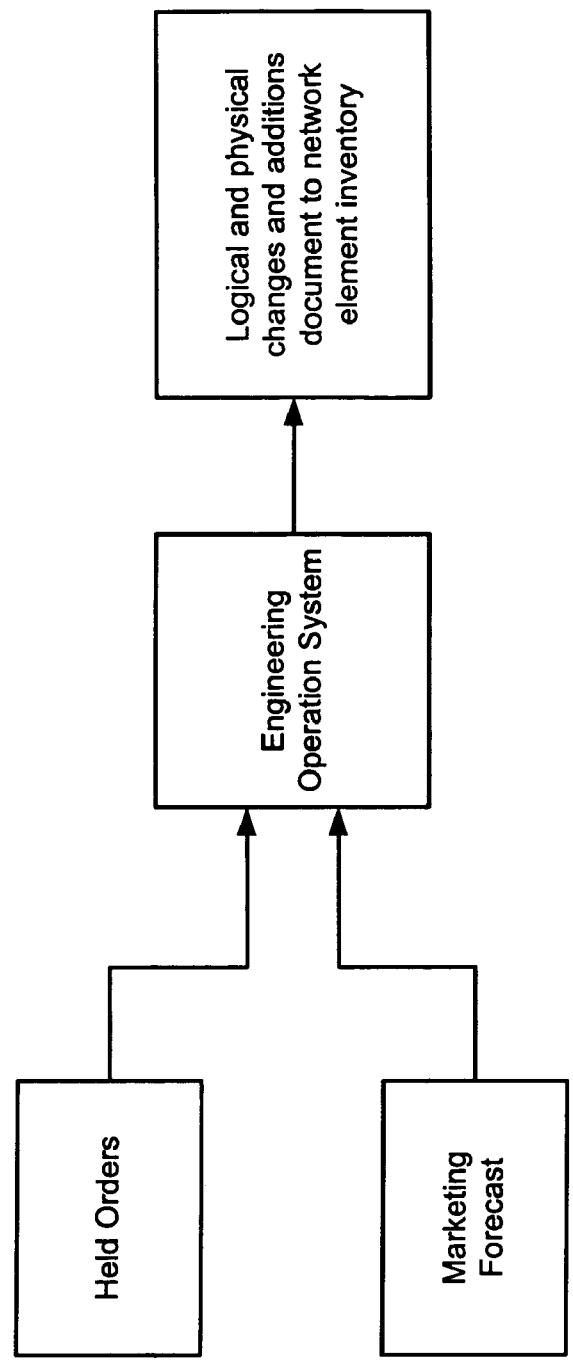

FIG. 4b illustrates the engineering process in more detail. As shown, engineering 406 receives the marketing forecast. Additionally, engineering may receive a view of held orders, which are orders that were taken but were not filled, from network element inventory 106. Engineering 406 then makes a decision to build new physical network elements or modify existing physical network elements to increase capacity. In one embodiment, engineering 406 may build new network elements and/or modify network elements in either CO 206 midloop 208. To document the changes in CO 206 or midloop 208, manual records are created to represent new and/or modified network elements and track the construction. Additionally, during the engineering design process, engineering 406 determines virtual associations or assignments between the installed network elements. These assignments define the virtual or logical path of data flow for customers. Engineering 406 also keeps manual records of the assignments. The physical and virtual inventories are then entered into network element inventory 106 as planned inventory.

Figure 4C:
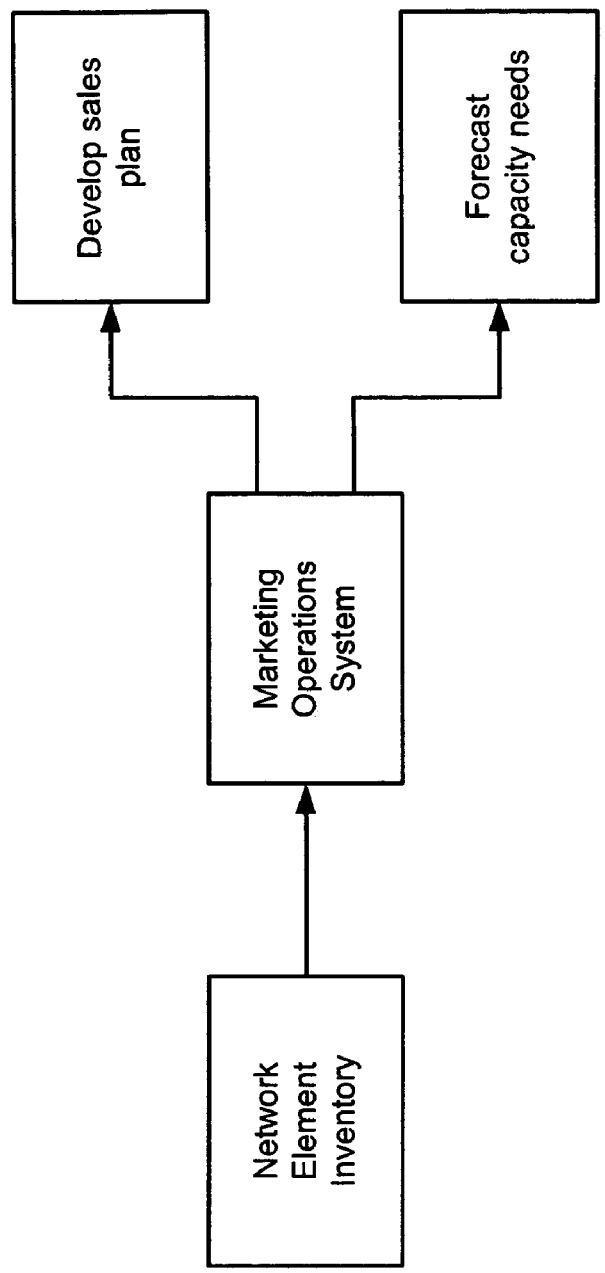

In FIG. 4c, marketing 404 is constantly monitoring the consumption of capacity of the network to enable marketing 404 to provide guidance to sales 402. The review is accomplished by querying network element inventory 106 for a view of planned and self-discovered logical and physical inventory information. From the view, marketing 404 develops a tactical sales plan for sales 402 and a revised capacity forecast for engineering 406.

Figure 4D:
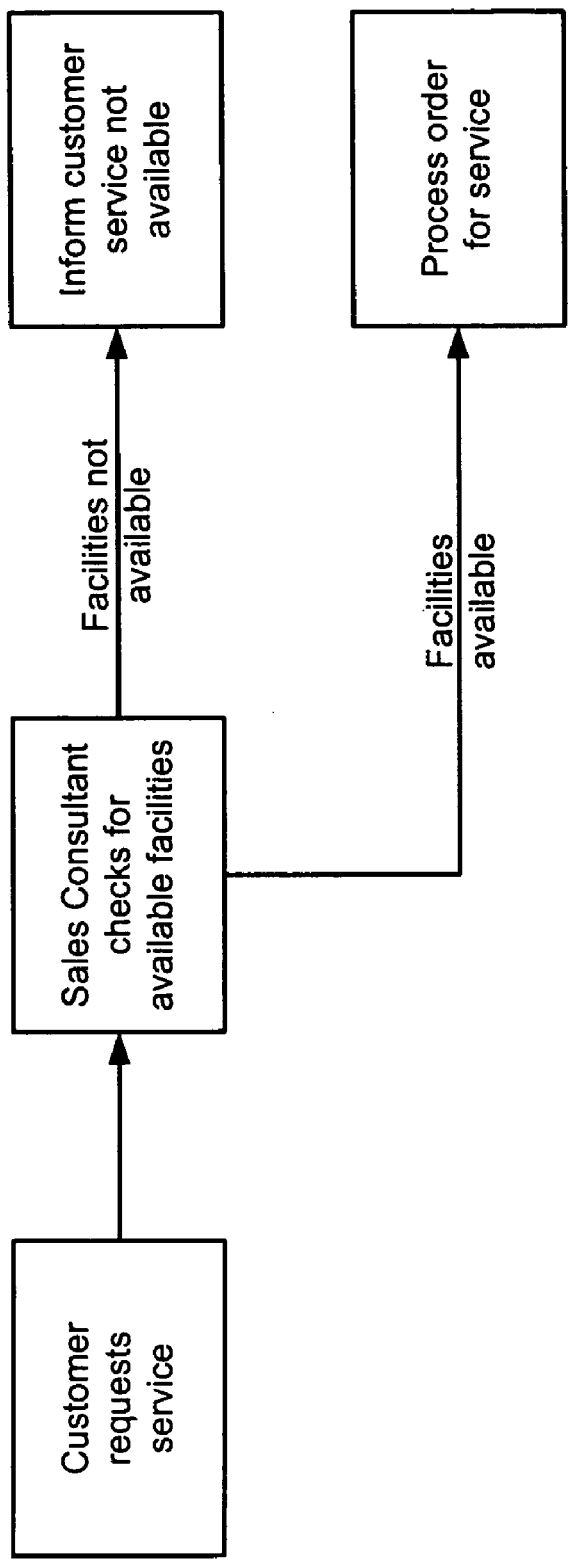

In FIG. 4d, sales 402 receives a request for service. Sales 402 queries network element inventory 106 for network quality and service availability for that specific customer. Using network element inventory 106, sales 402 receives a desired view of information and processes the order based on self-discovered used and available and planned capacity. Additionally, sales 402 may verify network quality.

Synchronization:

In order to ensure each operation system receives an accurate view of inventory of the network, network element inventory 106 synchronizes network discovered physical 302 and logical inventory with the planned inventory 306. By synchronizing the network inventory creates an accurate view of planned inventory 306, self-discovered physical 302, and logical 304 inventory. Typically, different views may be created for each operation system. For example, engineering 406 may need different inventory information than sales 402 and/or marketing 404. Thus, different views may be created for each group.

The view of inventory may be created using self-discovered physical 302 and logical 304 inventory, planned inventory 306, and compared self-discovered and planned inventory. In some cases, planned and self-discovered inventory overlap and are compared by network element inventory 106 to determine if what was thought was built is what was actually built. If the comparison does not indicate planned inventory 306 matches self-discovered physical 302 and logical 304 inventories, network element inventory 106 may indicate that the inventories do not match or may choose one of the planned or self-discovered physical 302 or logical inventory 304. Additionally, a repair ticket may be issued or an operation system may be notified to investigate the discrepancy. In some cases, planned inventory 306 and self-discovered physical 302 and logical 304 inventories do not overlap and thus, just the planned 306 or self-discovered physical 302 and logical 304 information is included in the view.

As described above, network element inventory 106 is constantly accessed by different operation systems. For example, sales 402, marketing 404, and engineering 406 within an organization are different operation systems and require different views of the network element inventory. With the network continually changing, the departments may not receive an accurate view of the network inventory if network element inventory 106 is not updated. Thus, in order to ensure an accurate view of the network inventory, the network element inventory 106 is updated when changes, additions, or updates are made to the network in real-time. Additionally, network element inventory 106 may be updated when requests are made or on a periodic basis.

Thus, when changes, additions, and/or updates are made to the network and are received by network element inventory 106, they are synchronized with existing inventory. Once network element inventory 106 is synchronized, new views may be sent to the operation systems. Alternatively, new views may be provided only when they are requested and/or on a periodic basis. Thus, operation systems will be accessing accurate and current data from network element inventory 106.

Planned network inventory 306 is synchronized when changes or additions are made to network 102. For example, port/card updates are automatically synchronized when changes are made to the port/cards or port/cards are added to network 102. Additionally, IOF/Fiber inventory is automatically updated and synchronized. Further, changes to VCI/NVPI pools are automatically updated and synchronized. Thus, when a request for a view of network element inventory 106 is made, the inventory may be updated and synchronized before the view is sent to the requester. Therefore, an accurate and up-to-date view of the network inventory is provided. Additionally, when changes in the network element inventory are discovered, synchronized views may be sent to different operation systems automatically.

Physical 302 and logical 304 inventory is updated by network 102 self discovering the installed network elements. The update may be done nightly or in non-real-time, or may be done on a real-time basis using a polling process that automatically creates a current network inventory. Once the network is self-discovered, the self-discovered inventory is synchronized with the existing network element inventory. Thus, when a request is made, network element inventory 106 may be synchronized with non-real-time or real-time data before returning the request.

Figure 5:
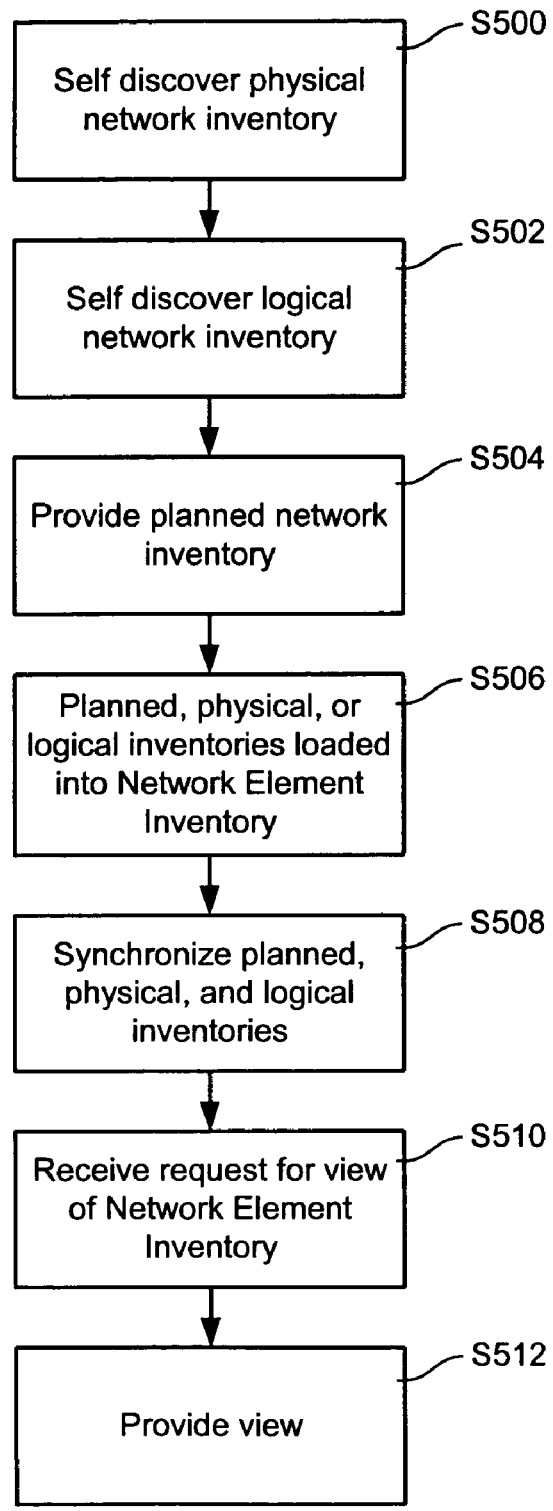
FIG. 5 illustrates a method for managing a network element inventory.

FIG. 5 illustrates a method for managing a network element inventory according to one embodiment. In step S500, physical network inventory 302 is self-discovered by network 102. Self-discovered physical network inventory 302 may be discovered in real-time or non-real-time.

In step S502, logical network inventory 304 is self-discovered by the network. Self-discovered logical network inventory 304 may be discovered in real-time or non-real-time.

In step S504, planned network inventory 306 is provided. Once the physical 302, logical 304, and planned 306 network inventory is discovered, the inventories are loaded into network element inventory 106 (Step S506).

In step S508, physical 302, logical 304, and planned 306 inventories are synchronized. In step S510, a request for a view of network element inventory 106 is received. An accurate view of network element inventory 106 is then provided (Step S512).

Uses of the Network Element Inventory Capacity Checking

Figure 6:
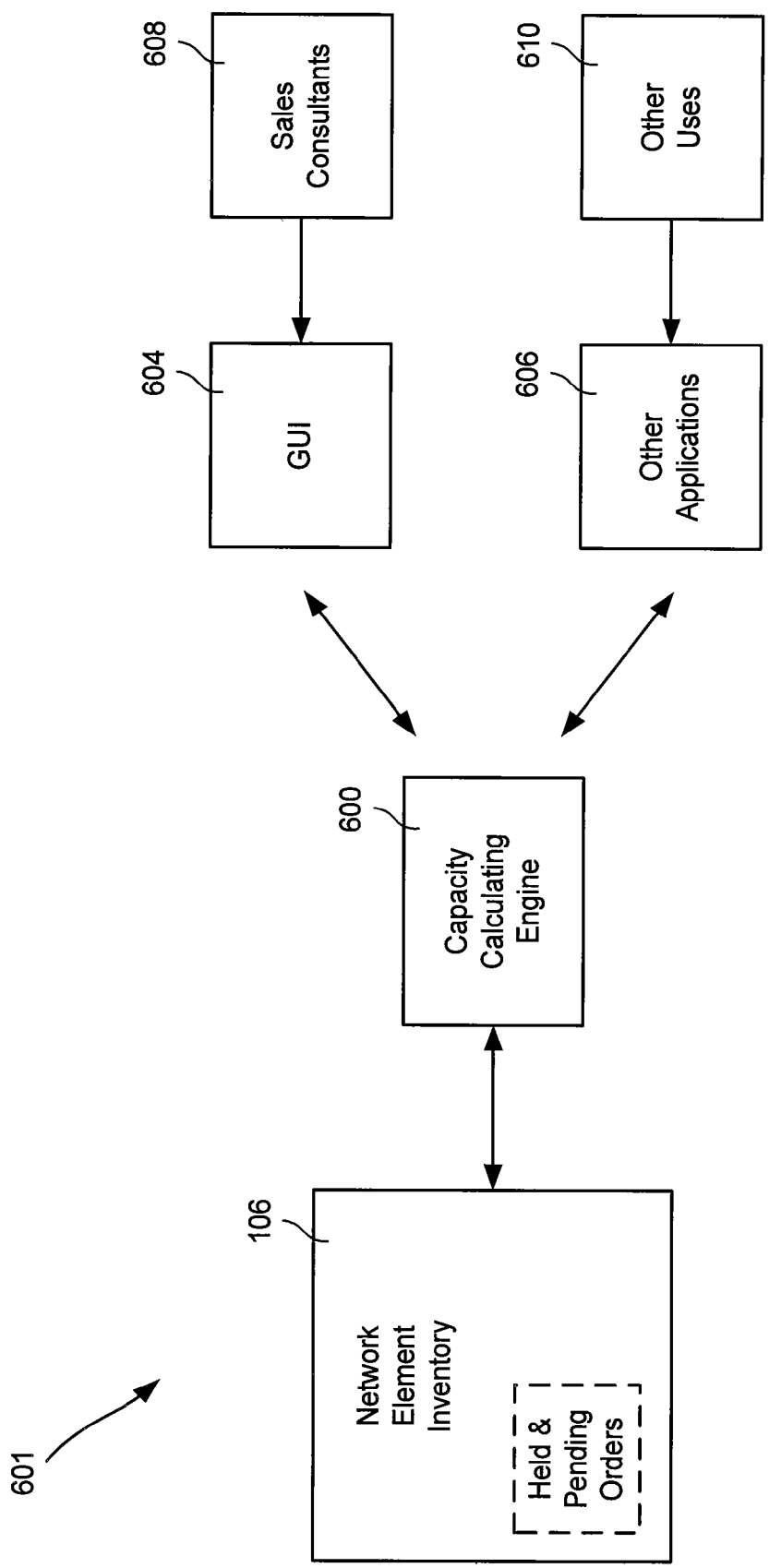
FIG. 6 illustrates elements of a capacity calculating engine environment.

FIG. 6 illustrates elements of a capacity calculating engine (CCE) environment 600 according to one embodiment. As shown, a capacity calculating engine 602, sales graphical user interface (GUI) 604, other applications 606, and network element inventory 106 are shown. Additionally, network element inventory 106 includes held and pending order files.

Capacity calculating engine 600 receives requests for a determination of capacity for a network from sales consultants 608 and/or other users 610 through sales GUI 604 or other applications 606. Once receiving a request, CCE 602 communicates with network element inventory 106 to provide a calculation on capacity of network 102. In one embodiment, the capacity calculation is a calculation of possible and spare virtual and physical capacity. Additionally, the calculation may include a determination of network quality.

In one embodiment, capacity may be expressed in terms of possible and spare capacity. Possible capacity is a maximum number of users minus the enabled number of users for the network element. Maximum capacity is the maximum number of users a network element may support. However, the network element may not be enabled to provide service for the maximum number of users. For example, the network element may only be enabled to provide service for half of the maximum number. Thus, possible capacity is the capacity not enabled to provide service. Spare capacity takes the enabling number into account and determines capacity as the number of users the network element is enabled to provide service minus the number of users currently using the service. For example, the network element may include a maximum number of ten ports. However, only five of the ports may be enabled to provide service. Of those five ports, three ports may be in use presently. Thus, possible capacity is five ports and spare capacity is two ports. In other words, two ports may be immediately enabled for service and five additional ports are available to provide service if enabled.

In one embodiment, capacity checking engine 600 determines spare VDSL port capacity of CO DSLAM 230 and RT DSLAM 236, such as BDTs, ONUs, USAMs, BNUs, and MDUs. Although the following description will be described in terms of capacity for these units, it will be understood by a person of skill in the art that capacity checking engine 600 may be able to check other network element capacities and is not limited to just VDSL port capacities.

In one embodiment, possible and spare capacity is calculated based on variations of video/data port capacities in different network elements. For example, the following table illustrates various RT DSLAM 236 types and their maximum video/data port capacity and maximum telephone port capacities according to one embodiment.

| RT DSLAM 236 Port Capacities | | |
|---|---|---|
| RT Type | Maximum Video/Data Port Capacity | Maximum Tel Port Capacity |
| BNU-8 | 8 | 12 |
| BNU-16 & MDU | 16 | 24 |
| BNU-1636 | 16 | 36 |
| USAM Split Brain Mode (OC-3) | 32 | |
| USAM Single Mode (OC-3) | 16 | |
| USAM Single Mode (OC-12) | 32 | |

It should be understood that a reference table is being provided as an example and many variations of this table are contemplated.

In one embodiment, capacity checking engine 600 may check network 102 for network quality to ensure the network is properly configured to offer service to the service area identifier. CCE 600 may set flags or return codes that indicate the quality of network 102. The following table illustrates examples of possible return codes according to one embodiment.

Normal
Empty slots available for service
BNU Telephony capacity exhausted
One or more invalid input cable name format
Central office not found
One or more BDT/ODU combinations not found
Too many BNU/MDU derived cables
Fatal error
TBD—future Return Codes Conditions It should be understood that the conditions in the table are not mutually exclusive and any combination of these conditions may be returned. Also, the flags or return codes are not limited to the codes shown in the table.

Figure 7:
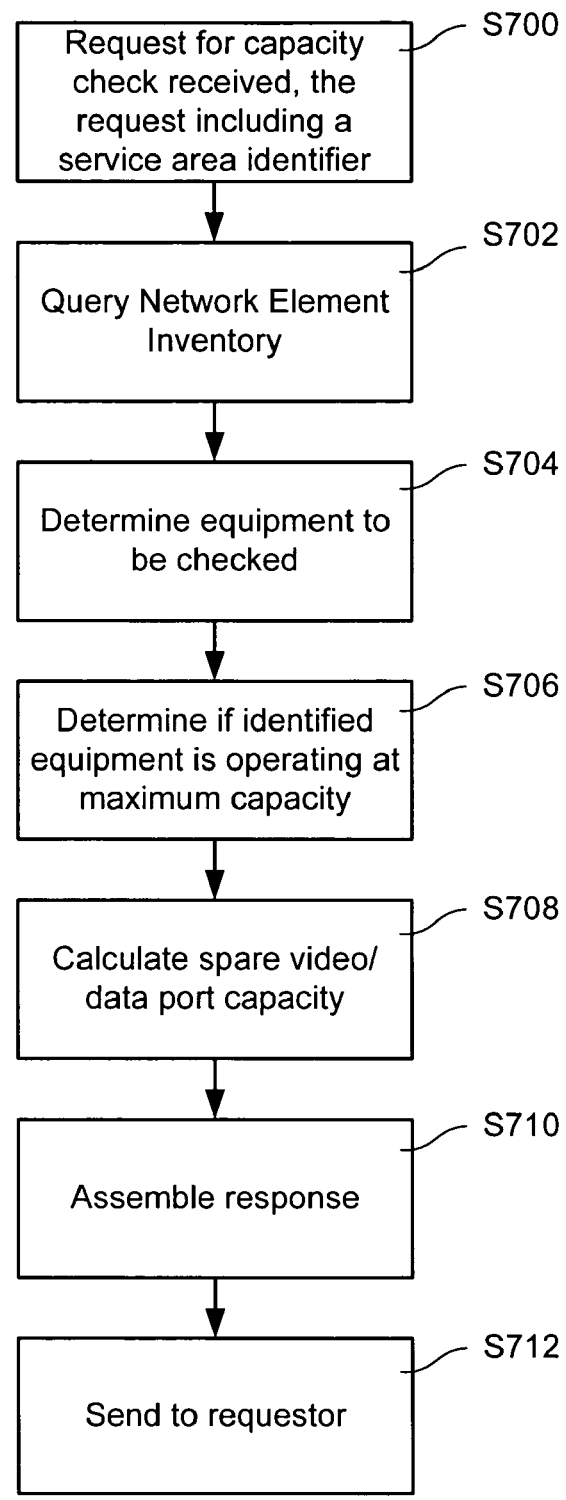
FIG. 7 illustrates a method of determining capacity for a network.

FIG. 7 illustrates a method of determining capacity for network 102 according to one embodiment. In one embodiment, capacity may be expressed in port quantities. In another embodiment, capacity may be expressed in terms of card or slot quantities. Cards or slots include a number of ports, such as two. The ports in the cards or slots are enabled to serve customers.

In step S700, a request for capacity is received by capacity calculating engine 600. The request includes a service area identifier, which identifies a particular customer or group of customers. In one embodiment, the service area identifier may be a telephone number. The service area identifier is used to identify network elements or a path of network elements in network 102. In one embodiment, the identifier may include a wire center CLLI code (code of a CO 206) or cable designators for a RT DSLAM 236 (Fiber to the Node configuration) to cross box or RT DSLAM 236 (Fiber to the Curb configuration) to a service area identifier cable.

In one embodiment, the identifier is parsed to determine if it is in the proper format. An appropriate response code flag is then set. For example, a response code flag, such as one or more invalid input cable name format, is set if cable designators are not in a proper format. If all cable designations are not in a proper format, a fatal error may be returned. In step S702, network element inventory 106 is queried for data relating to the service area identifier. In one embodiment, a list of network elements related to the service area identifier is returned.

In Step S704, CCE 600 determines the network elements to be checked from the service area identifier. Additionally, CCE 600 may test for and set a response code flag for either of the following conditions if either exist: if the information received from network element inventory 106 indicates CO 206 is not in the database, a flag, such as "central office not found" or "fatal error," may be returned, or if the received information indicates an RT is connected to central office 206 is not in the database, a flag indicating "one or more CO 206/RT DSLAM 236 combinations are not found" may be returned. Further, if all discovered CO 206/RT DSLAM 236 combinations are not in the database, a fatal error response may be returned. Also, fiber connections, such as OC-3c and OC-12c and special RT DSLAM 236 configurations, such as split brain mode, may be tested.

In one embodiment, CCE 600 may check and determine if telephony usage is at a maximum. In one embodiment, if RT DSLAM 236 and/or data service usage is at a maximum, a response code flag indicating that "plain old telephone service (POTS) usage is at a maximum" may be set.

In Step S706, the identified equipment is checked to determine if the identified equipment has possible capacity available. In one embodiment, CCE 600 takes the maximum number of ports minus the number of ports present to determine the possible capacity. In one embodiment, CCE 600 may also determine a number of possible cards or slots available for service. In one embodiment, a response flag, such as "empty slots available for service" may be set if the number of ports present in the identified equipment are less than the maximum supported number of ports.

In Step S708, the spare video/data port capacity is calculated for each network element identified. CCE 600 determines the number of video/data ports present and the number of video/data ports in use for each network element identified. In one embodiment, the spare video/data port capacity is calculated as video/data ports present less the video/data ports in use. The calculation represents the number of spare physical ports that are presently available for service activation.

In another embodiment, the spare capacity calculation includes using a number of defective port/card slots and the number of possible port/card slots. In this embodiment, CCE 600 calculates spare capacity as the calculated spare capacity plus the number of possible video/data ports or cards minus the number of defective ports or cards.

CCE 600 adds the number of possible video/data ports to the spare capacity. By adding the number of possible video/data ports, service will not be denied if service may be offered by the network even if additional maintenance is needed to enable the possible video/data ports. Also, the number of possible video/data ports may be added as 2 video/data ports per possible card slot. In this case, it is assumed that there are 2 video/data ports per card or slot.

Additionally, CCE 600 subtracts the number of defective ports from the spare capacity. By subtracting the number of defective ports, a more accurate view of capacity is presented. A port may have been enabled for service but for some reason is defective and cannot deliver service. Thus, the defective port is not considered available for service. Additionally, defective possible ports are not taken into account in the capacity calculation. Also, the calculation may use cards instead of ports. In one embodiment, the number of defective video/data ports may be subtracted as 2 video/data ports per defective card slot. In this case, it is assumed that there are 2 video/data ports per card or slot.

In another embodiment, CCE 600 may use a number of held and pending orders to calculate spare capacity. In this embodiment, the CCE will compute the spare video/data ports capacity as the calculated spare video/data ports less the number of held or pending orders for the video service. The held and pending orders for the data service are not considered by the capacity checking engine. A reason video service held and pending orders are considered and not the data service held and pending orders is because the video service is given priority over data service. One reason video service is given priority is because of the potential for greater profits. However, in other embodiments, the data service held and pending orders may take priority over the video service or both the video and data service held and pending orders may be taken into consideration. The held and pending orders for video service are taken into account because capacity for pending video service should preferably not be taken up by other orders. A service provider does not want to replace a held and pending video service order with a data service order.

In another embodiment, the spare video/data port capacity may be broken down by distinguishing between video and data. For example, a number of data only ports in the spare video/data ports is returned with the spare capacity calculation. Different combinations of services may be enabled for a port. For example, a port may be enabled for video and data, video-only, and data-only. In one embodiment, it is desired to enable ports with video services and thus, priority is given to video and data service, and video only services. A reason for giving video priority is it is expected that video services are more profitable than data services. Thus, if the number of spare data-only ports are known, the remaining spare ports may be reserved for video, and data or video-only services. Thus, spare video data ports reserved for video services will not be reserved by data-only services. However, in other embodiments, data services may be given priority over video services. The goal is to give priority to the most profitable services.

In Step S710, a response is assembled and sent to the requestor. In one embodiment, the total spare video/data port capacity for the service area identifier is reported. The total is the sum of the spare ports of each individual network element identified. The response may include any of the above calculations of spare capacity. Also, the response may include all the set response code flags indicating network quality.

Additionally, in one embodiment, the response message may include the following: the received wire center CLLI code, received cable designation(s), the parsed CO 206/RT DSLAM 236 combination, the set response code flags, and/or a spares available yes/no indicator. In one embodiment, the yes flag will be sent if the sum of the spare video/data ports at RT DSLAM 236 location is greater than five or if the sum of the spare video/data port at RT DSLAM 236 (Fiber to the Curb configuration) location is greater than one. If either of these conditions are not met, a no will be sent. In another embodiment, the spares available yes/no indicator will indicate yes if the total quality of the spare video/data ports is greater than zero for any of the available network elements for the service area identifier. If there are not spare video/data ports, then a no will be indicated.

Additionally, for each network element checked, a CO DSLAM 230 and/or RT DSLAM 236 number, IP address, CK ID number, DSLAM type, RT DSLAM 236 CLLI, address (location) and quantity of spare video/data ports present may be reported.

In one embodiment, if a failed error condition occurs with any of the above determinations by the CCE 600, a response to the query may include the following: a received wire center CLLI code received cable destinations, available pairs, response code (indicating all set conditions including the fatal error flag), spares available yes/no indicator of no, and zero as a spare video/data port quantity. Additionally, no individual CO DSLAM 230 and/or RT DSLAM 236 assignment information may be returned.

Figure 8:
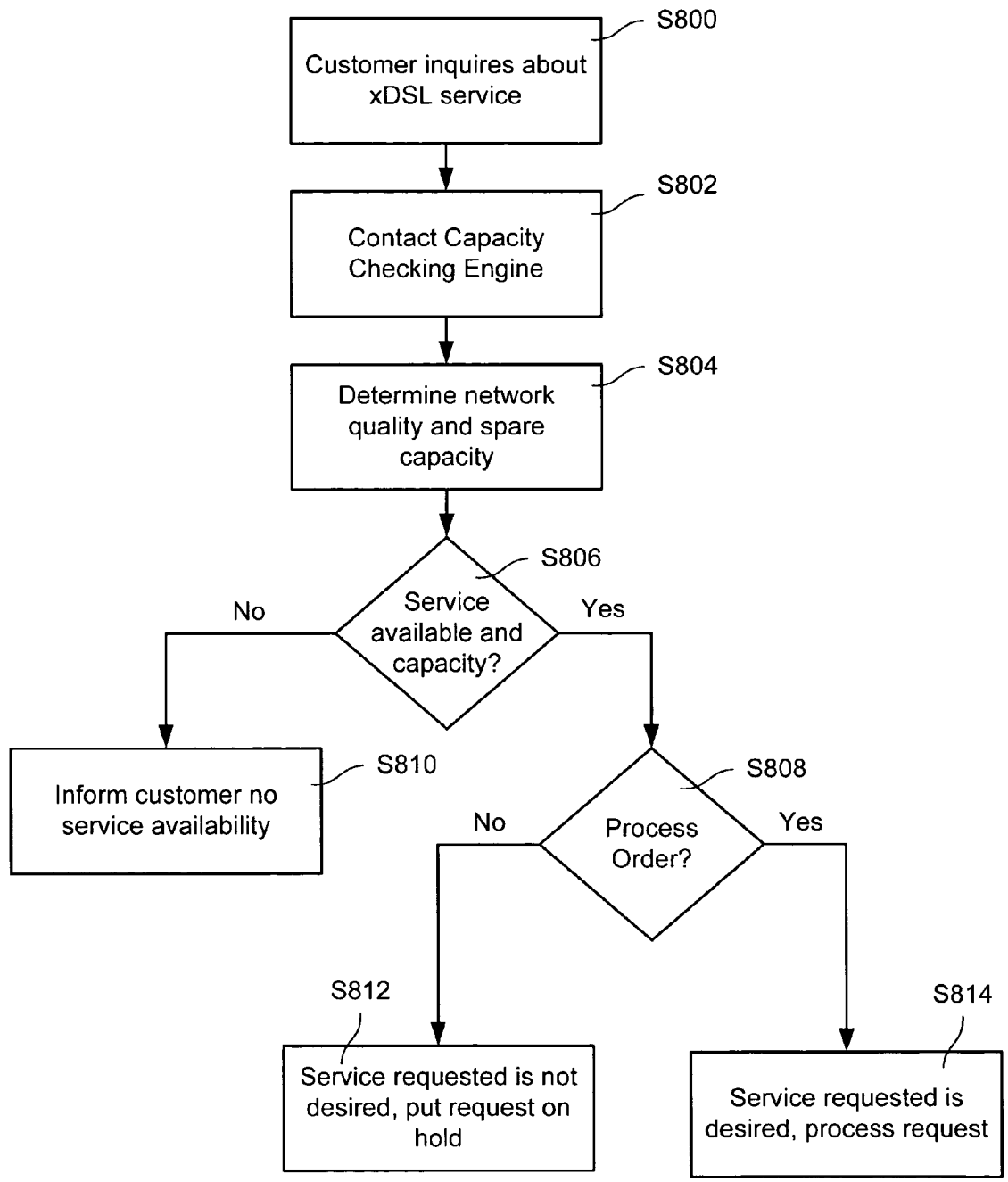
FIG. 8 illustrates a method for handling customer inquiries for video and data service according to one embodiment.

FIG. 8 illustrates a method for handling customer inquiries for video and data service. Step S800, a customer inquires about possible service either through the web or through a sales consultant. The sales consultant then contacts the capacity checking engine to determine in real-time the loop quality and service availability (Step S802). In step S804, capacity checking engine 600 determines the loop quality of the network and spare capacity for a service area identifier for the customer. If there is service availability and capacity, the sales consultant may process the order for service (Step S808). However, if capacity is not available and/or there are not service availability, a sales consultant will inform the customer that service is not available (Step S810). The sales consultant may approve or disapprove the request for service based on video and data port availability. The sales consultant may not want to fill up all video/data ports for the service area identifier and may decide to put a data only request on hold (Step S812). However, a sales consultant wants to receive as many video requests as possible and would approve a request for a video service over a data service (Step S814).

By using the CCE, a sales consultant is relieved of many manual tasks, such as referring to documents relating to capacity and also accessing computer databases and looking for and matching service area identifiers to entries in the database. These entries, in both cases, may be out of date. However, using the CCE, the requested data may be returned to the client or sales consultant in less than 2 seconds or in most cases within 5 seconds. Thus, the CCE increases customer service and provides more reliable service to customers requesting VDSL service.

In other embodiments, network element inventory 106 may be used to provide an inventory history. Additionally, in another embodiment, network element inventory 106 may be used by a web portal that allows users to view and/or manage network element inventory 106.

The above description is illustrated but not restrictive. Many variations of the invention will become apparent to those skilled in the art upon review of this disclosure. The scope of the invention should, therefore, be determined not with reference to the above description, but instead should be determined with reference to the pending claims along with their full scope or equivalents.

What is claimed is:

1. A method for processing customer requests for spare capacity in a video and data network from a network element database comprising:

receiving, at a capacity checking engine, an electronic signal for a request of a customer inquiry for spare capacity in the video and data network from a customer requesting a service for the video and data network, wherein the request comprises a service area identifier corresponding to the customer;

identifying equipment to check for spare capacity from the service area identifier, wherein the equipment identified is used to provide the service to the customer on the video and data network;

determining if the identified equipment has spare data and video capacity using real-time information for the identified equipment in the network element inventory to determine physical or logical network elements that are available to provide service;

if the equipment has spare data and video capacity, calculating spare video and data capacity for the equipment based on the physical or logical network elements that are available to provide service, wherein the spare video and data capacity is used to provide the service to the customer, if desired; and providing an answer, using the capacity checking engine, for the request for spare capacity while being connected to the customer during the customer inquiry, the answer based on the spare video and data capacity calculation.

2. The method of claim 1, wherein the video and data network comprises a Digital Subscriber Line (xDSL) network.

3. The method of claim 1, wherein the video and data network comprises a Very high data rate DSL (VDSL) network.

4. The method of claim 1, wherein calculating spare video/data capacity for the equipment comprises calculating a number of video and data ports available minus a number of video and data ports in use.

5. The method of claim 4, further comprising determining possible capacity for the equipment.

6. The method of claim 5, wherein possible capacity comprises possible video/data ports.

7. The method of claim 6, wherein calculating spare video/data capacity for the equipment comprises adding the possible video/data ports to the spare video/data capacity calculation.

8. The method of claim 7, further comprising determining a number of defective video/data ports.

9. The method of claim 8, wherein calculating spare video and data capacity for the equipment comprises subtracting the number of defective video/data ports from the spare video/data capacity calculation.

10. The method of claim 4, further comprising determining a number of held and pending video service orders for the service area identifier.

11. The method of claim 10, wherein calculating spare video and data capacity for the equipment comprises subtracting the number of held and pending video service orders from the spare video/data capacity calculation.

12. The method of claim 4, further comprising determining a number of data only ports.

13. The method of claim 12, wherein calculating spare video and data capacity for the equipment comprises returning the number of data only ports in the spare capacity calculation.

14. The method of claim 1, wherein checking the network element database to determine if the identified equipment has spare data and video capacity comprises checking if the identified equipment has spare physical video/data capacity.

15. The method of claim 1, wherein checking the network element database to determine if the identified equipment has spare data and video capacity comprises checking if the identified equipment has spare physical video/data capacity.

16. The method of claim 1, further comprising checking the network element database to determine if the identified equipment telephony usage is at a maximum.

17. A method for processing customer requests for services on a video and data network, the method comprising:
  receiving, at a capacity checking engine, an electronic signal for a request of a customer inquiry from a customer for a service on the video and data network;
  determining a service area identifier for the customer;
  identifying equipment to check for spare capacity from the service area identifier, wherein the equipment identified is used to provide the service to the customer on the video and data network;
  determining if the identified equipment has spare data and video capacity using real-time information for the identified equipment in the network element inventory to determine physical or logical network elements that are available to provide service; and
  if the equipment has spare data and video capacity, calculating spare video and data capacity for the equipment based on the physical or logical network elements that are available to provide service;
  providing an answer, using the capacity checking engine, for the request for service while being connected to the customer during the customer inquiry based on the calculated spare video and data capacity for the equipment.

18. The method of claim 17, wherein the answer comprises denying the request for service when no spare video and data capacity exists.

19. The method of claim 17, wherein the answer comprises denying the request for service when spare video and data capacity exists but the capacity is not sufficient to offer the service to the customer.

20. The method of claim 17, wherein the answer comprises approving the request for service when spare video and data capacity exists.

21. An apparatus for processing customer requests for spare capacity in a video and data network from a network element database, the apparatus comprising logic configured to perform a set of steps comprising:
  receiving, at a capacity checking engine, an electronic signal for a request of a customer inquiry for spare capacity in the video and data network from a customer requesting a service for the video and data network, wherein the request comprises a service area identifier corresponding to the customer;
  identifying equipment to check for spare capacity from the service area identifier, wherein the equipment identified is used to provide the service to the customer on the video and data network;
  determining if the identified equipment has spare data and video capacity using real-time information for the identified equipment in the network element inventory to determine physical or logical network elements that are available to provide service;
  if the equipment has spare data and video capacity, calculating spare video and data capacity for the equipment based on the physical or logical network elements that are available to provide service, wherein the spare video and data capacity is used to provide the service to the customer, if desired; and
  providing an answer, using the capacity checking engine, for the request for spare capacity while being connected to the customer during the customer inquiry, the answer based on the spare video and data capacity calculation.

22. The apparatus of claim 21, wherein the video and data network comprises a Digital Subscriber Line (xDSL) network.

23. The apparatus of claim 21, wherein the video and data network comprises a Very high bit rate DSL (VDSL) network.

24. The apparatus of claim 21, wherein calculating spare video/data capacity for the equipment comprises calculating a number of video and data ports available minus a number of video and data ports in use.

25. The apparatus of claim 24, further comprising determining possible capacity for the equipment.

26. The apparatus of claim 25, wherein possible capacity comprises possible video/data ports.

27. The apparatus of claim 26, wherein calculating spare video/data capacity for the equipment comprises adding the possible video/data ports to the spare video/data capacity calculation.

28. The apparatus of claim 27, further comprising determining a number of defective video/data ports.

29. The apparatus of claim 28, wherein calculating spare video and data capacity for the equipment comprises subtracting the number of defective video/data ports from the spare video/data capacity calculation.

30. The apparatus of claim 24, further comprising determining a number of held and pending video service orders for the service area identifier.

31. The apparatus of claim 30, wherein calculating spare video and data capacity for the equipment comprises subtracting the number of held and pending video service orders from the spare video/data capacity calculation.

32. The apparatus of claim 24, further comprising determining a number of data only slots.

33. The apparatus of claim 32, wherein calculating spare video and data capacity for the equipment comprises returning the number of data only slots in the spare capacity calculation.

34. The apparatus of claim 21, wherein checking the network element database to determine if the identified equipment has spare data and video capacity comprises checking if the identified equipment has spare virtual video/data capacity.

35. The apparatus of claim 21, wherein checking the network element database to determine if the identified equipment has spare data and video capacity comprises checking if the identified equipment has spare physical video/data capacity.

36. The apparatus of claim 21, further comprising checking the network element database to determine if the identified equipment telephony usage is at a maximum.

* * * * *